(12) United States Patent
Golikov et al.

(10) Patent No.: US 11,994,623 B2
(45) Date of Patent: May 28, 2024

(54) LiDAR METHODS AND SYSTEMS WITH CONTROLLED FIELD OF VIEW BASED ON OPTICAL FIBER MOVEMENT

(71) Applicant: YANDEX SELF DRIVING GROUP LLC, Moscow (RU)

(72) Inventors: Andrey Victorovich Golikov, Zelenograd (RU); Nikolay Evgenievich Orlov, Udmurtskaya Resp (RU); Dmitry Valentinovich Solomentsev, Moscow (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 808 days.

(21) Appl. No.: 17/110,496

(22) Filed: Dec. 3, 2020

(65) Prior Publication Data
US 2021/0190921 A1     Jun. 24, 2021

(30) Foreign Application Priority Data
Dec. 23, 2019     (RU) .......................... RU2019143301

(51) Int. Cl.
*G01S 7/00* (2006.01)
*G01S 7/481* (2006.01)
(Continued)

(52) U.S. Cl.
CPC .......... *G01S 7/4818* (2013.01); *G01S 7/4817* (2013.01); *G02B 6/036* (2013.01); *G02B 26/0875* (2013.01); *G02B 26/103* (2013.01)

(58) Field of Classification Search
USPC ...................................................... 356/4.01
See application file for complete search history.

(56) References Cited

U.S. PATENT DOCUMENTS

| 5,095,472 A | 3/1992 | Uchino et al. |
| 5,317,148 A | 5/1994 | Gray et al. |

(Continued)

FOREIGN PATENT DOCUMENTS

| CN | 108693504 A | 10/2018 |
| DE | 4411994 A1 | 11/1995 |

(Continued)

OTHER PUBLICATIONS

European Search Report completed on Apr. 26, 2021 issued in respect of the European Patent Application No. 20190274.9.
(Continued)

*Primary Examiner* — James R Hulka
(74) *Attorney, Agent, or Firm* — BCF LLP

(57) ABSTRACT

LiDAR systems and methods for detecting objects in a region of interest (ROI) comprising radiation source for emitting an output beam; optical fiber communicatively coupled to radiation source for receiving and transmitting output beam, and emitting output beam from output end with first spread; actuator coupled to the optical fiber for imparting movement to output end, the movement comprising positions of the output end defining total first spread of output beam; optical lens positioned by focal distance from output end and configured to transmit output beam towards the ROI and to cause output beam to spread by second spread which is larger than first spread, and a total second spread when output end is moving being larger than total first spread; and a processor for controlling the actuator and the movement to modulate angle of spread of the output beam in the ROI.

18 Claims, 8 Drawing Sheets

(51) Int. Cl.
    *G02B 6/036*     (2006.01)
    *G02B 26/08*     (2006.01)
    *G02B 26/10*     (2006.01)

(56) References Cited

U.S. PATENT DOCUMENTS

| | | | |
|---|---|---|---|
| 5,359,403 | A | 10/1994 | Grosmann et al. |
| 6,034,811 | A | 3/2000 | Seaver |
| 6,330,095 | B1 | 12/2001 | Ozawa |
| 6,804,269 | B2 | 10/2004 | Lizotte et al. |
| 7,440,084 | B2* | 10/2008 | Kane .................. G02B 6/4204 356/5.01 |
| 7,847,235 | B2* | 12/2010 | Krupkin ............... G01S 7/4868 250/227.12 |
| 7,936,448 | B2* | 5/2011 | Albuquerque ......... G01S 7/491 356/5.01 |
| 8,212,995 | B2* | 7/2012 | Koehler ................ G01S 7/481 356/4.01 |
| 8,508,723 | B2* | 8/2013 | Chang ................... G01S 17/58 356/28 |
| 8,946,637 | B2* | 2/2015 | Chinn .................. G01S 7/4817 250/338.4 |
| 10,120,214 | B2* | 11/2018 | Irish ...................... G02F 1/113 |
| 10,281,582 | B2 | 5/2019 | Elooz et al. |
| 10,564,267 | B2* | 2/2020 | Grauer ................. G01S 17/931 |
| 10,976,413 | B2* | 4/2021 | Han ..................... G01S 7/4817 |
| 11,112,491 | B2* | 9/2021 | Abediasl .............. G02F 1/2955 |
| 11,428,818 | B2* | 8/2022 | Petit ...................... G01S 17/42 |
| 11,567,175 | B2* | 1/2023 | Roger .................. G01S 7/4817 |
| 2002/0110077 | A1 | 8/2002 | Drobot et al. |
| 2002/0196534 | A1* | 12/2002 | Lizotte ............... G02B 27/106 359/362 |
| 2006/0132752 | A1 | 6/2006 | Kane |
| 2009/0262760 | A1 | 10/2009 | Krupkin et al. |
| 2010/0271614 | A1 | 10/2010 | Albuquerque et al. |
| 2011/0228249 | A1 | 9/2011 | Koehler et al. |
| 2012/0206712 | A1 | 8/2012 | Chang et al. |
| 2014/0231647 | A1 | 8/2014 | Chinn et al. |
| 2017/0234976 | A1 | 8/2017 | Grauer et al. |
| 2017/0248783 | A1 | 8/2017 | Gruhlke |
| 2018/0095304 | A1 | 4/2018 | Irish et al. |
| 2018/0100929 | A1 | 4/2018 | O'Keeffe et al. |
| 2018/0120441 | A1* | 5/2018 | Elooz ..................... G05D 1/024 |
| 2018/0217237 | A1 | 8/2018 | Irish |
| 2018/0231640 | A1 | 8/2018 | Han et al. |
| 2018/0306925 | A1 | 10/2018 | Hosseini et al. |
| 2019/0004151 | A1 | 1/2019 | Abediasl et al. |
| 2019/0094345 | A1 | 3/2019 | Singer et al. |
| 2019/0101628 | A1 | 4/2019 | Roger et al. |
| 2019/0212420 | A1 | 7/2019 | Petit |
| 2019/0212454 | A1 | 7/2019 | Petit |

FOREIGN PATENT DOCUMENTS

| | | |
|---|---|---|
| EP | 1508057 A2 | 2/2015 |
| RU | 2550776 C1 | 5/2015 |
| RU | 2567469 C2 | 11/2015 |
| WO | 9847036 A1 | 10/1998 |
| WO | 18029136 A1 | 2/2018 |

OTHER PUBLICATIONS

Partial European Search Report issued in European patent application No. 20190274.9 on Feb. 1, 2021.

European Search Report issued in corresponding European patent application No. 20190272.3 on Nov. 16, 2020.

Hair et al., "Airborne High Spectral Resolution Lidar for profiling aerosol optical properties", Applied Optics, vol. 47, No. 36, 2008, https:/patarnott.com/atms360/pdf_atms360/LidarMexicoCity.pdf, p.p. 6734-6753.

Russian Search report issued on Jul. 6, 2021 in respect of the Russian Patent Application RU 2019143315.

Russian Search Report issued on Jun. 22, 2021 in respect of the Russian patent application No. 2019143301.

Russian Search Report issued on Jun. 10, 2021 in respect of the counterpart Russian patent application No. 2019143312.

Office Action issued on Nov. 20, 2023 in respect of the related U.S. Appl. No. 17/116,195.

* cited by examiner

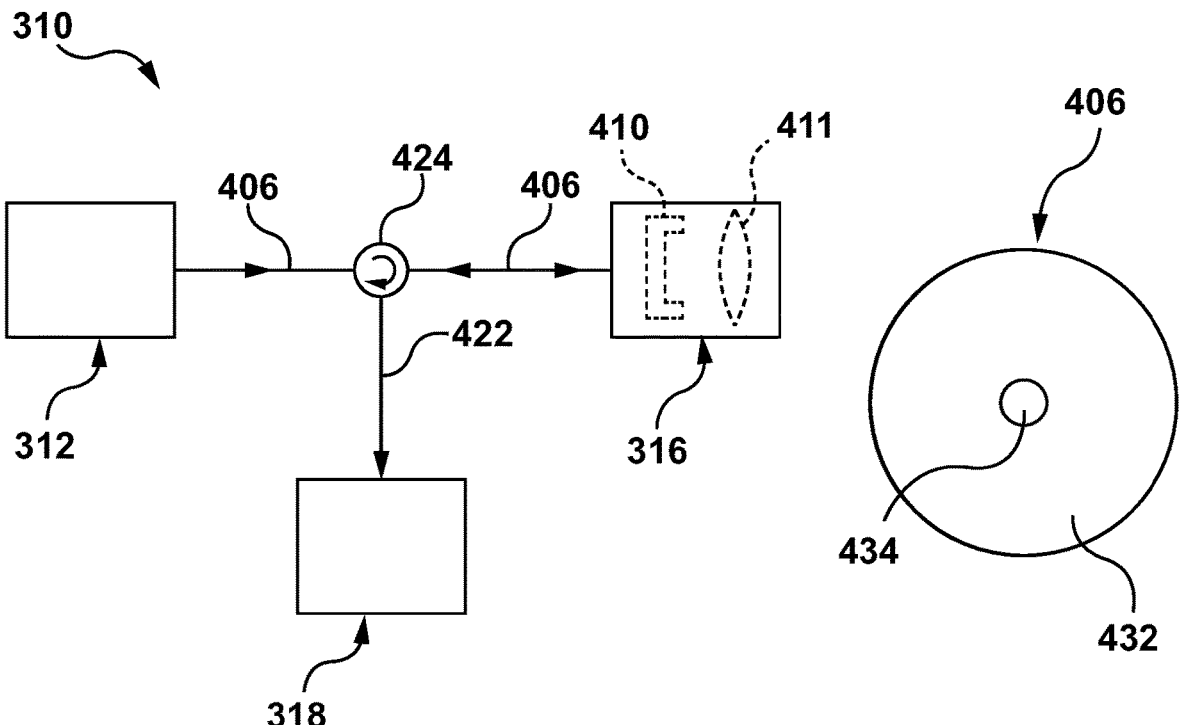
FIGURE 5
FIGURE 6
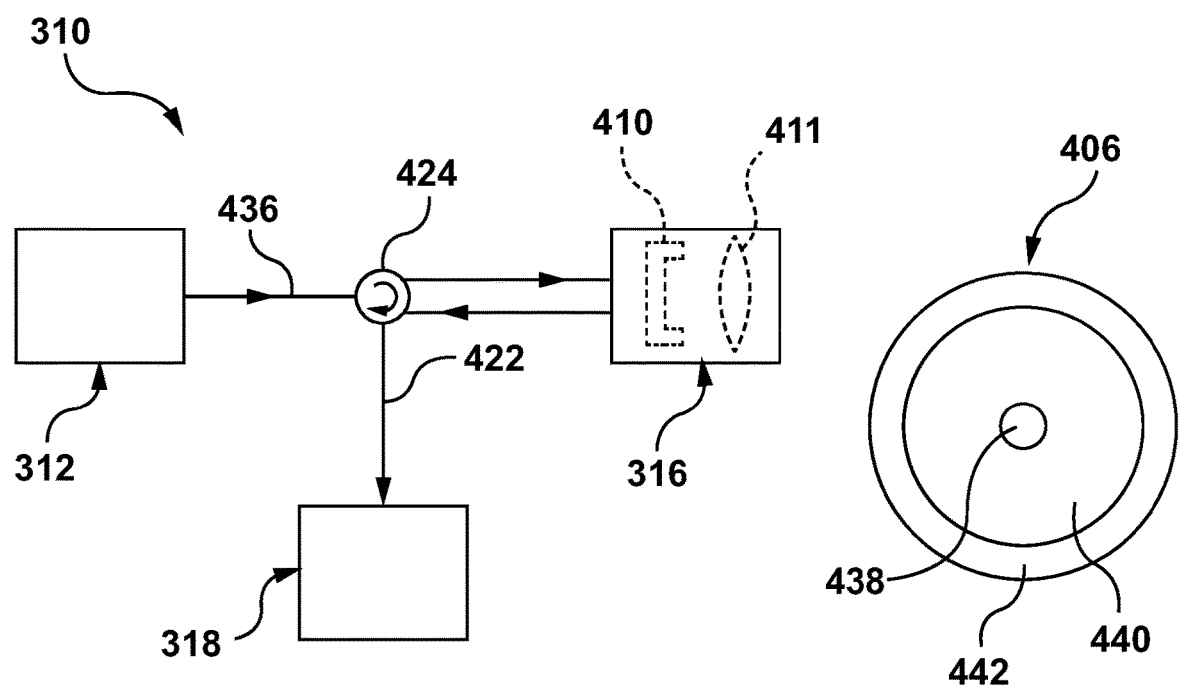
FIGURE 7
FIGURE 8

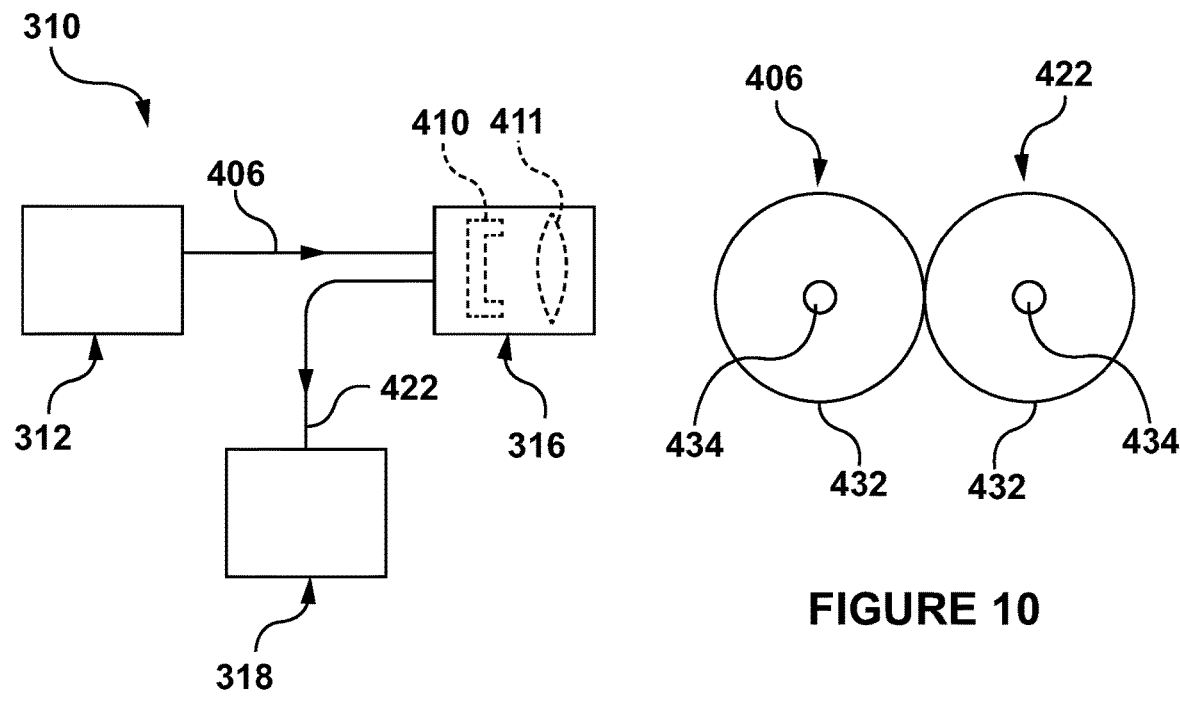
FIGURE 9
FIGURE 10
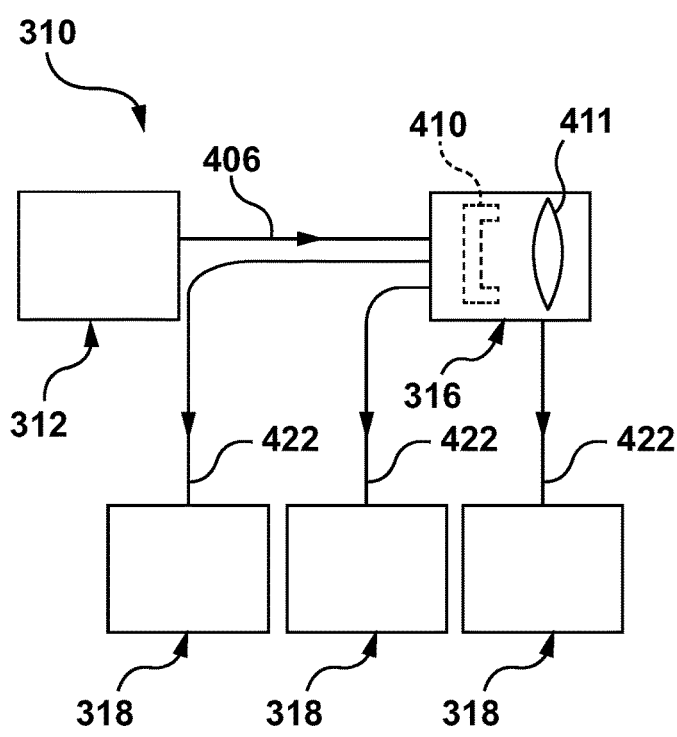
FIGURE 11
FIGURE 12
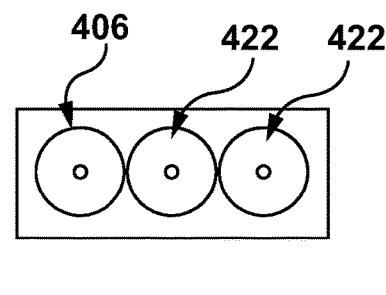
FIGURE 13

LiDAR METHODS AND SYSTEMS WITH CONTROLLED FIELD OF VIEW BASED ON OPTICAL FIBER MOVEMENT

CROSS-REFERENCE

The present application claims priority to Russian Patent Application No. 2019143301, entitled "LiDAR Methods and Systems with Controlled Field of View Based on Optical Fiber Movement," filed on Dec. 23, 2019, the entirety of which is incorporated herein by reference.

FIELD OF TECHNOLOGY

The present technology relates to Light Detection and Ranging (LiDAR) systems, and more specifically, to LiDAR systems for detecting objects in a region of interest.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacle) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect an object located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes.

Other technical challenges with the implementation of the above systems include de-calibration of sensors and other components that gather data about the surroundings of the vehicle. A plethora of factors, including weather, road conditions, driving habits, for example, influence sensors and other components over time, requiring calibration in order to ensure that data is accurately captured and correctly used for controlling vehicles.

In LiDAR-based systems, objects around the vehicle can be detected by transmitting beams of light towards a region of interest, and measuring reflected light beams with a detector. Lasers emitting pulses of light within a narrow wavelength are often used as the light source. The position and distance of the object can be computed using Time of Flight calculations of the emitted and detected light beam. By computing such positions as "data points", a digital multi-dimensional representation of the surroundings can be generated.

In rotational LiDAR-based systems, the light beams are caused to rotate about a horizontal or vertical axis which can provide a scan of the region of interest in the horizontal or vertical plane, respectively. Typically, such rotation of the beams is achieved by a laser which is rotatable. However, moving components of the LiDAR system are prone to wear and tear leading to premature failure of the system.

It may be desirable, in certain applications, to obtain as large a region of interest as possible. In this respect, a number of lasers can be provided which are arranged to emit light beams in differing directions, thus enlarging the region of interest obtained with a single laser. However, increasing the number of lasers in a single LiDAR-based system can be prohibitively expensive.

SUMMARY

Therefore, there is a need for systems and methods which avoid, reduce or overcome the limitations of the prior art.

The area which can be scanned (also referred to as "region of interest" (ROI)) by conventional rotational LiDAR systems is determined, on a horizontal axis, by an extent of available rotation of a light beam about a rotation axis. In certain systems which include a microelectromechanical (MEM) component, scanning on a vertical axis is also possible and limited by an amplitude of oscillation of the MEM component.

Known methods of further increasing the scanned area comprise increasing the number of light sources or MEM components, with the associated disadvantages of increased expense and decreased lifetime of the LiDAR systems.

Broadly, inventors have developed a LiDAR system that can scan an increased area compared to conventional systems without the use of additional light sources and taking into account the minimization of moving components, in certain embodiments. In certain embodiments, LiDAR systems of the present technology have an increased angle of spread of the beam of light transmitted to the region of interest, on one or both of the horizontal or vertical axis.

In certain embodiments, advantages of the present technology include an increased capacity of the system without compromising an expense and complexity of the system.

In accordance with a first broad aspect of the present technology, there is provided a LiDAR system for detecting objects in a region of interest, the system comprising a radiation source for emitting an output beam; a first optical fiber with an input end communicatively coupled to the radiation source for receiving the output beam and configured to transmit the output beam having an optical axis along the first optical fiber to an output end for emitting the output beam, the output beam having a first spread; an actuator coupled to the first optical fiber for imparting a first optical fiber movement to the output end of the first optical fiber, the first optical fiber movement comprising a plurality of positions of the output end of the first optical fiber defining a total first spread of the output beam when the output end is moving; an optical lens positioned by a focal distance from the output end of the first optical fiber, the optical lens being configured to transmit the output beam through the optical lens towards the region of interest and to cause the output beam to spread by a second spread of the output beam, the second spread being larger than the first spread, and a total second spread of the output beam when the output end is moving being larger than the total first spread; and a processor for controlling the actuator and the first optical fiber movement to modulate the angle of spread of radiation of the output beam in the region of interest.

In certain embodiments, the actuator comprises a piezoelectric component.

In certain embodiments, the LiDAR system further comprises a detection system for detecting an input beam from the region of interest, the detection system comprising: a detector; and a second optical fiber configured to transmit the input beam to a detector, the second optical fiber having: an input end for receiving the input beam, and an output end communicatively coupled to the detector, wherein the actuator is coupled to the second optical fiber for imparting a second optical fiber movement to the input end of the second optical fiber, the processor configured to control the actuator and the second optical fiber movement of the second optical fiber.

In certain embodiments, the actuator is configured to cause the second optical fiber movement to be physically coordinated with the first optical fiber movement.

In certain embodiments, the actuator is configured to induce the first optical fiber movement simultaneously with the second optical fiber movement.

In certain embodiments, the first optical fiber is selectively connected to the second optical fiber such that the input beam received at the output end of the first optical fiber can be redirected to the second optical fiber.

In certain embodiments, the system further comprises a detection system for detecting an input beam from the region of interest, the detection system comprising: a detector; and a second optical fiber configured to transmit the input beam to the detector and selectively communicatively coupled to the first optical fiber, the second optical fiber having: an input end for receiving the input beam from the first optical fiber, and an output end communicatively coupled to the detector.

In certain embodiments, the system further comprises an optical circulator for selectively transmitting the input beam from the region of interest to the second optical fiber.

In certain embodiments, the at least the output end of the first optical fiber has a double cladding construction comprising a first channel for transmitting the input beam and a second channel for transmitting the output beam.

In certain embodiments, the total first spread of the first optical fiber is along a first plane, the first plane being the same as a plane of the first optical fiber movement. In certain embodiments, the total second spread is along the first plane.

In certain embodiments, the actuator comprises a fixing component to fix the first optical fiber at a first fixing point along a length of the first optical fiber, the first fixing point defining a pivot point of the output end of the first optical fiber.

In certain embodiments, the actuator comprises a fixing component to fix the second optical fiber at a second fixing point along a length of the second optical fiber, the second fixing point defining a pivot point of the input end of the second optical fiber.

In certain embodiments, the total first spread of the output beam is between about 5° and about 40°.

In certain embodiments, the total second spread of the output beam is between about 5° and about 40°.

In certain embodiments, the total first spread of the first optical fiber is along two planes, the two planes being the same as two planes of the first optical fiber movement.

In certain embodiments, the system further comprises at least one replacement optical lens having different optical properties than the optical lens.

From another aspect, there is provided a LiDAR method for detecting objects in a region of interest, the method being implemented by a processor communicatively connected to a LiDAR system, the method comprising: causing a radiation source to emit an output beam incident on a first optical fiber, the first optical fiber having an input end communicatively coupled to the radiation source and configured to transmit the output beam along an optical axis of the first optical fiber to an output end, the output beam at the output end having a first spread; causing an actuator coupled to the first optical fiber to impart a first optical fiber movement to the output end of the first optical fiber, the first optical fiber movement comprising a plurality of positions of the output end of the first optical fiber defining a total first spread of the output beam when the output end is moving; wherein an optical lens positioned by a focal distance from the output end of the first optical fiber is configured to transmit the output beam through the optical lens towards the region of interest and to cause the output beam to spread by a second spread of the output beam, the second spread being larger than the first spread, and a total second spread of the output beam when the output end is moving being larger than the total first spread.

In certain embodiments, the method further comprises the processor selectively controlling the actuator to modulate the first optical fiber movement to control the angle of spread of radiation of the output beam in the region of interest. In certain embodiments, modulation of the first optical fiber movement is responsive to a detected object in the region of interest.

By means of certain embodiments of the present technology, an area of the region of interest which is scanned by the present systems and methods can be increased without increasing the number of LiDAR systems (or number of light sources and light detectors), and the number of moving parts in the system. This can, in turn, translate to costs savings and increasing a longevity of the LiDAR system.

In the context of the present specification, a "radiation source" broadly refers to any device configured to emit radiation such as a radiation signal in the form of a beam. A radiation source includes, but is not limited to a light source configured to emit light beams. The light source may be a laser such as a solid-state laser, laser diode, a high power laser, or an alternative light source such as, a light emitting diode (LED)-based light source. Some (non-limiting) examples of the light source are Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the light source may emit light beams in differing formats, such as light pulses, continuous wave (CW), quasi-CW, and so on. In some non-limiting examples, the light source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" may also be referred to as a radiation beam, such as a light beam, reflected from one or more objects in the ROI. By reflected is meant that at least a portion of the output beam incident on one or more objects in the ROI, bounces off the one or more objects. The output beam may have one or more parameters such as: time-of-flight (i.e., time from emission until detection), instantaneous power (e.g., power signature), average power across entire return pulse, and photon distribution/signal over return pulse period etc.

In the context of the present specification, a "Region of Interest" may broadly include a portion of the observable environment of LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 5 depicts a schematic representation of the LiDAR system of FIG. 4 implemented in accordance to a specific non-limiting embodiment of the present technology;

FIG. 6 depicts a cross-sectional profile of an optical fiber of the LiDAR system of FIG. 5;

FIG. 7 depicts a schematic representation of the LiDAR system of FIG. 4 implemented in accordance to an alternative non-limiting embodiment of the present technology;

FIG. 8 depicts a cross-sectional profile of an optical fiber of the LiDAR system of FIG. 7;

FIG. 9 depicts a schematic representation of the LiDAR system of FIG. 4 implemented in accordance to a further alternative non-limiting embodiment of the present technology;

FIG. 10 depicts a cross-sectional profile of an optical fiber and a return optical fiber of the LiDAR system of FIG. 9;

FIG. 11 depicts a schematic representation of the LiDAR system of FIG. 4 implemented in accordance to a yet further alternative non-limiting embodiment of the present technology;

FIG. 12 depicts a cross-sectional profile of an optical fiber and return optical fibers of the LiDAR system of FIG. 11 according to certain embodiments of the present technology;

FIG. 13 depicts a cross-sectional profile of an optical fiber and return optical fibers of the LiDAR system of FIG. 11 according to certain embodiments of the present technology;

DETAILED DESCRIPTION

Figure 1:
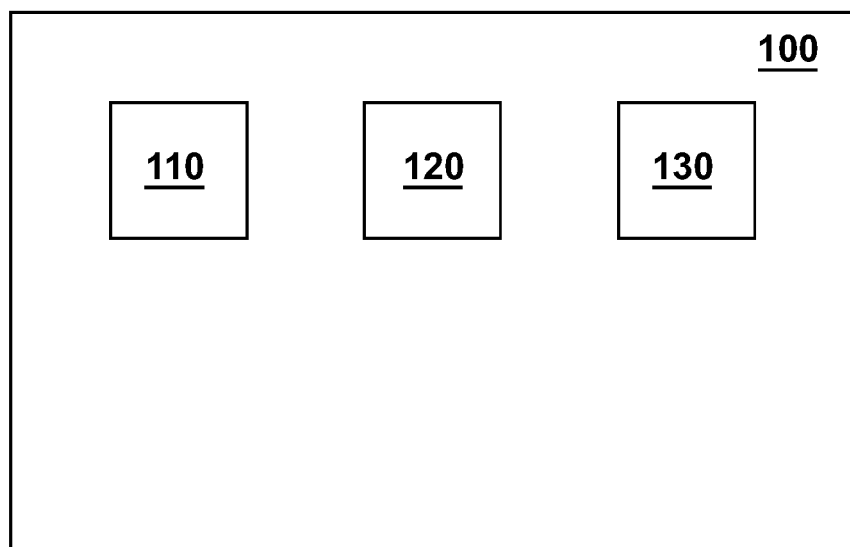
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
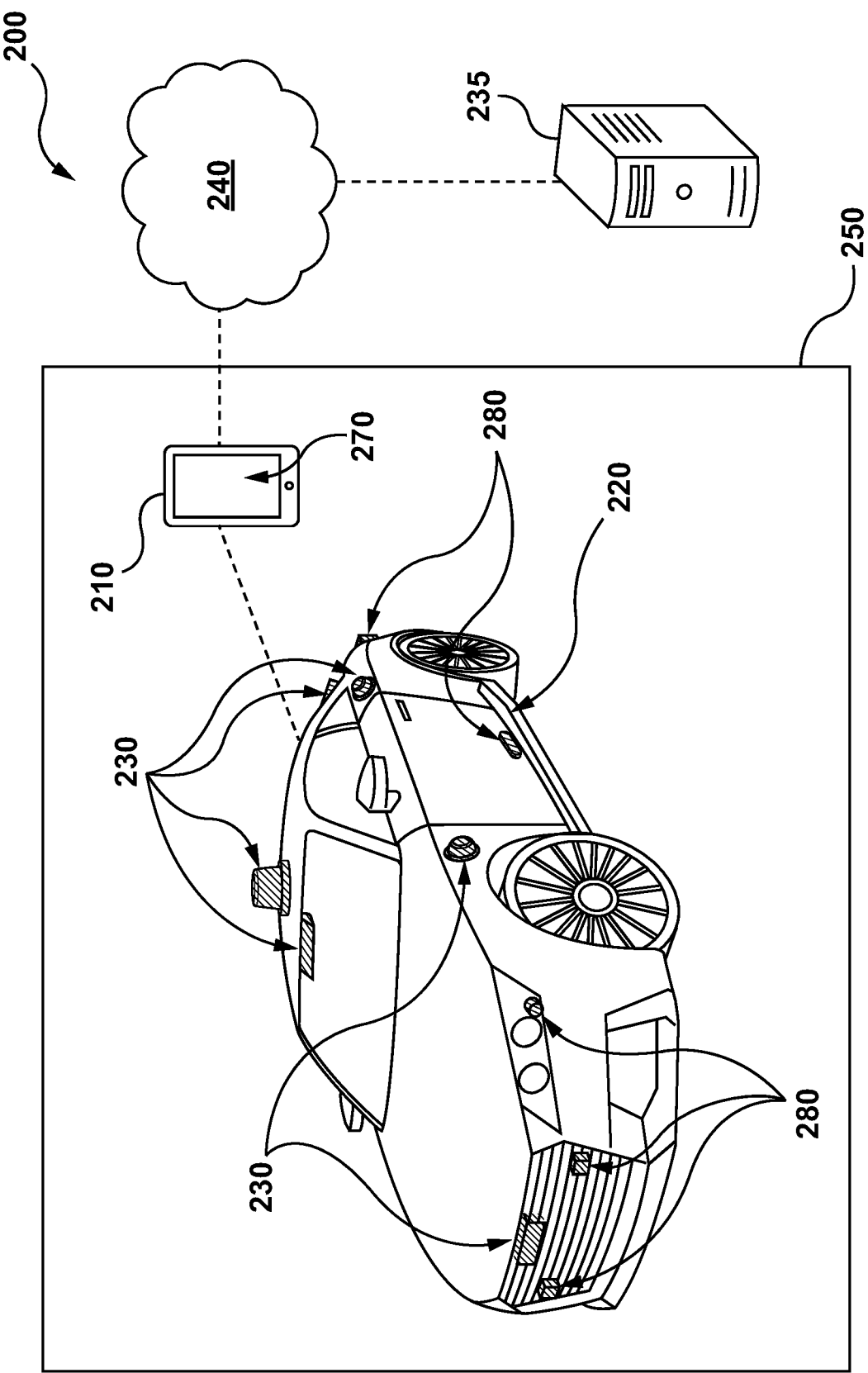
FIG. 2 depicts a networked computing environment being suitable for use with certain embodiments of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who is associated with the vehicle 220, such as an operator of the vehicle 220, a server 235 in communication with the electronic device 210 via a communication network 240 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any transportation vehicle, for leisure or otherwise, such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. In at least some embodiments of the present technology, it is contemplated that the vehicle 220 may be implemented as a Self-Driving Car (SDC). It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is an on-board computer device and comprises the processor 110, the solid-state drive 120 and the memory 130. In other words, the electronic device 210 comprises hardware and/or software and/or firmware, or a combination thereof, for processing data as will be described in greater detail below.

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with the server 235.

In some embodiments of the present technology, the server 235 is implemented as a computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may comprise one or more camera-type sensor systems that are mounted to the vehicle 220 and communicatively coupled to the processor 110. Broadly speaking, the one or more camera-type sensor systems may be configured to gather image data about various portions of the surroundings 250 of the vehicle 220. In some cases, the image data provided by the one or more camera-type sensor systems may be used by the electronic device 210 for performing object detection procedures. For example, the electronic device 210 may be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 may comprise one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220 and which data may be representative of distance of objects from the radar-type sensor system, orientation of objects, velocity and/or speed of objects, and the like.

It should be noted that the plurality of sensor systems 280 may comprise additional types of sensor systems to those non-exhaustively described above and without departing from the scope of the present technology.

Furthermore, the vehicle 220 is equipped with one or more Light Detection and Ranging (LiDAR) systems for gathering information about surroundings 250 of the vehicle 220. The LiDAR systems may be in addition to, or in some cases instead of, the plurality of sensor systems 280. A given LiDAR system 230 from the one or more LiDAR systems may be mounted, or retrofitted, to the vehicle 220 in a variety of locations and/or in a variety of configurations.

For example, a given LiDAR system 230 may be mounted on an interior, upper portion of a windshield of the vehicle 220. Nevertheless, as illustrated in FIG. 2, other locations for mounting the given LiDAR system 230 are within the scope of the present disclosure, including on a back window, side windows, front hood, rooftop, front grill, front bumper or the side of the vehicle 220. In some cases, the given LiDAR system 230 can even be mounted in a dedicated enclosure mounted on the top of the vehicle 220.

As mentioned above, the LiDAR system 230 may also be mounted in a variety of configurations.

In one embodiment, such as that of FIG. 2, the given LiDAR system 230 of the one or more LiDAR systems is mounted to the rooftop of the vehicle 220 in a rotatable configuration. For example, the given LiDAR system 230 mounted to the vehicle 220 in a rotatable configuration may comprise at least some components that are rotatable 360 degrees about an axis of rotation of the given LiDAR system 230. It should be noted that the given LiDAR system 230 mounted in rotatable configurations may gather data about most of the portions of the surroundings 250 of the vehicle 220.

In another embodiment, such as that of FIG. 2, the given LiDAR system 230 of the one or more LiDAR systems is mounted to the side, or the front grill, for example, in a non-rotatable configuration. For example, the given LiDAR system 230 mounted to the vehicle 220 in a non-rotatable configuration may comprise at least some components that are not rotatable 360 degrees and are configured to gather data about pre-determined portions of the surroundings 250 of the vehicle 220.

Irrespective of the specific location and/or the specific configuration of the given LiDAR system 230, the LiDAR system 230 is configured to capture data about the surroundings 250 of the vehicle 220 for building a multi-dimensional map of objects in the surroundings 250 of the vehicle 220. How the given LiDAR system 230 are configured to capture data about the surroundings 250 of the vehicle 220 will now be described.

LiDAR System

Figure 3:
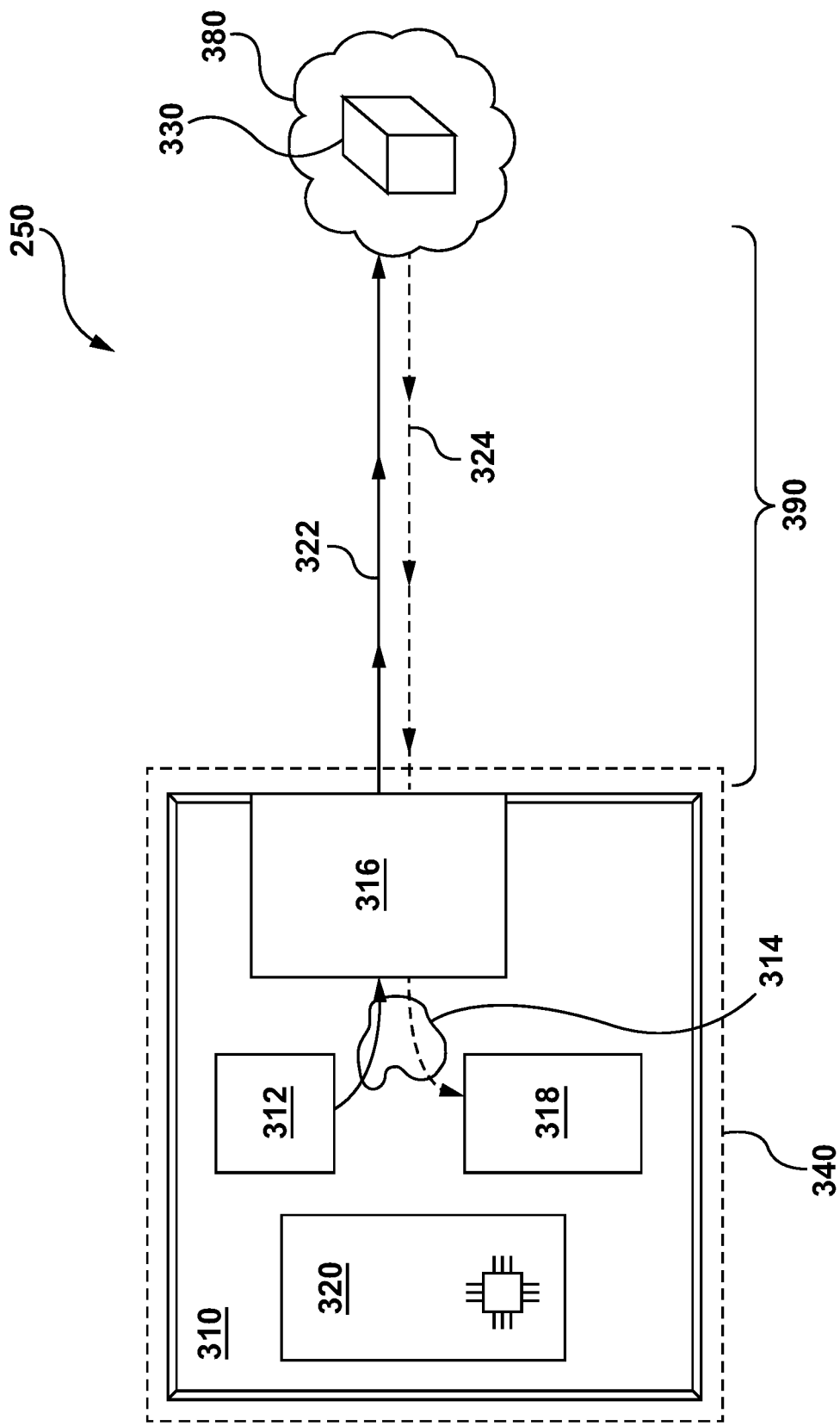
FIG. 3 depicts a schematic diagram of an example LiDAR system for implementing certain embodiments of systems and/or methods of the present technology.

With reference to FIG. 3, there is depicted a non-limiting example of a LiDAR system 310. It should be noted that the LiDAR system 230 (see FIG. 2) may be implemented in a similar manner to the implementation of the LiDAR system 310.

Broadly speaking, the LiDAR system 310 may comprise a variety of internal components such as, but not limited to: (i) a light source component 312 (also referred to as a "radiation source component"), (ii) a scanner component 316, (iii) a receiver component 318 (also referred to herein as a "detection system"), and (iv) a controller component 320. It is contemplated that in addition to the internal components non-exhaustively listed above, the LiDAR system 310 may further comprise a variety of sensors (such as, for example, a temperature sensor, a moisture sensor, etc.) which are omitted from FIG. 3 for sake of clarity.

In certain embodiments, one or more of the internal components of the LiDAR system 310 may be implemented in a common housing 340 as depicted in FIG. 3. In other implementations, at least the controller component 320 may be located outside of the common housing 340, and optionally remotely thereto.

Light Source Component

The light source component 312 is communicatively coupled to the controller component 320 and is configured to emit radiation, such as a radiation signal in the form of a beam. In certain embodiments, the light source component 312 is configured to emit light. The light source component 312 comprises one or more lasers that emit light having a particular operating wavelength. The operating wavelength of the light source component 312 may be in the infrared, visible, and/or ultraviolet portions of the electromagnetic spectrum. For example, the light source component 312 may include one or more lasers with an operating wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. However, it should be noted that the light source component 312 may include lasers with different operating wavelengths, without departing from the scope of the present technology. In certain other embodiments, the light source component 312 comprises a light emitting diode (LED) or a fiber-laser.

In operation, the light source component 312 generates an output beam 322 of light. It is contemplated that the output beam 322 may have any suitable form such as continuous-wave, or pulsed. As illustrated in FIG. 3, the output beam 322 exits the LiDAR system 310 and is directed downrange towards the surroundings 250.

Let it be assumed that an object 330 is located at a distance 390 from the LiDAR system 310. It should be noted though, as will be explained below in greater detail, the presence of the object 330 and the distance 390 are not apriori known and that the purpose of the LiDAR system 310 is to locate the object 330 and/or capture data for building a multi-dimensional map of at least a portion of the surroundings 250 with the object 330 (and other potential objects) being represented in it in a form of one or more data points.

Once the output beam 322 reaches the object 330, the object 330 may reflect at least a portion of light from the output beam 322, and some of the reflected light beams may return back towards the LiDAR system 310. By reflected is meant that at least a portion of light beam from the output beam 322 bounces off the object 330. A portion of the light beam from the output beam 322 may be absorbed by the object 330.

In the example illustrated in FIG. 3, the reflected light beam is represented by input beam 324. The input beam 324 is captured by the LiDAR system 310 via the receiver component 318. It should be noted that, in some cases, the input beam 324 may contain only a relatively small fraction of the light from the output beam 322. It should also be noted that an angle of the input beam 324 relative to a surface of the object 330 ("angle of incidence") may be the same or different than an angle of the output beam 322 relative to surface of the object 330 ("angle of reflection").

The operating wavelength of the LiDAR system 310 may lie within portions of the electromagnetic spectrum that correspond to light produced by the sun. Therefore, in some cases, sunlight may act as background noise which can obscure the light signal detected by the LiDAR system 310. This solar background noise can result in false-positive detections and/or may otherwise corrupt measurements of the LiDAR system 310. Although it may be feasible to increase a Signal-to-Noise Ratio (SNR) of the LiDAR system 310 by increasing the power level of the output beam 322, this may not be desirable in at least some situations. For example, increasing power levels of the output beam 322 may result in the LiDAR system 310 not being eye-safe.

It is contemplated that the LiDAR system 310 may comprise an eye-safe laser, or put another way, the LiDAR system 310 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

As previously alluded to, the light source component 312 may include one or more pulsed lasers configured to produce, emit, or radiate pulses of light with certain pulse duration. For example, the light source component 312 may be configured to emit pulses with a pulse duration (e.g., pulse width) ranging from 10 ps to 100 ns. In another example, the light source component 312 may emit pulses at a pulse repetition frequency of approximately 100 kHz to 5 MHz or a pulse period (e.g., a time between consecutive pulses) of approximately 200 ns to 10 µs. Overall, however, the light source component 312 can generate the output beam 322 with any suitable average optical power, and the output beam 322 may include optical pulses with any suitable pulse energy or peak optical power for a given application.

In some embodiments, the light source component 312 may comprise one or more laser diodes, such as but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source component 312 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source component 312 may include one or more laser diodes that are current-modulated to produce optical pulses.

In some embodiments, the output beam 322 emitted by the light source component 312 is a collimated optical beam with any suitable beam divergence for a given application. Broadly speaking, divergence of the output beam 322 is an angular measure of an increase in beam size (e.g., a beam radius or beam diameter) as the output beam 322 travels away from the light source component 312 or the LiDAR system 310. In some embodiments, the output beam 322 may have a substantially circular cross section.

It is also contemplated that the output beam 322 emitted by light source component 312 may be unpolarized or randomly polarized, may have no specific or fixed polarization (e.g., the polarization may vary with time), or may have a particular polarization (e.g., the output beam 322 may be linearly polarized, elliptically polarized, or circularly polarized).

In at least some embodiments, the output beam 322 and the input beam 324 may be substantially coaxial. In other words, the output beam 322 and input beam 324 may at least partially overlap or share a common propagation axis, so that the input beam 324 and the output beam 322 travel along substantially the same optical path (albeit in opposite directions). Nevertheless, in other embodiments, it is contemplated that the output beam 322 and the input beam 324 may not be coaxial, or in other words, may not overlap or share a common propagation axis inside the LiDAR system 310, without departing from the scope of the present technology.

It should be noted that in at least some embodiments of the present technology, the light source component 312 may be rotatable, such as by 360 degrees or less, about the axis of rotation (not depicted) of the LiDAR system 310 when the LiDAR system 310 is implemented in a rotatable configuration. However, in other embodiments, the light source component 312 may be stationary even when the LiDAR system 310 is implemented in a rotatable configuration, without departing from the scope of the present technology.

Internal Beam Paths

As schematically illustrated in FIG. 3, the LiDAR system 310 may make use of a given internal beam path from a plurality of internal beam paths 314 for emitting the output beam 322 (generated by the light source component 312) towards the surroundings 250. In one example, the given internal beam path amongst the plurality of internal beam paths 314 may allow providing the light from the light source component 312 to the scanner component 316 and, in turn, the scanner component 316 may allow the output beam 322 to be directed downrange towards the surroundings 250.

Also, the LiDAR system 310 may make use of another given internal beam path from the plurality of internal beam paths 314 for providing the input beam 324 to the receiver component 318. In one example, the another given internal beam path amongst the plurality of internal beam paths 314 may allow providing the input beam 324 from the scanner component 316 to the receiver component 318. In another example, the another given internal beam path amongst the plurality of internal beam paths 314 may allow providing the input beam 324 directly from the surroundings 250 to the receiver component 318 (without the input beam 324 passing through the scanner component 316).

It should be noted that the plurality of internal beam paths 314 may comprise a variety of optical components. For example, the LiDAR system 310 may include one or more optical components configured to condition, shape, filter, modify, steer, or direct the output beam 322 and/or the input beam 324. For example, the LiDAR system 310 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some embodiments, the given internal beam path and the another internal beam path from the plurality of internal beam paths 314 may share at least some common optical components, however, this might not be the case in each and every embodiment of the present technology.

Scanner Component

Generally speaking, the scanner component 316 steers the output beam 322 in one or more directions downrange towards the surroundings 250. The scanner component 316 may comprise a variety of optical components and/or mechanical-type components for performing the scanning of the output beam 322. For example, the scanner component 316 may include one or more mirrors, prisms, lenses, MEM components, piezoelectric components, optical fibers, splitters, diffractive elements, collimating elements, and the like. It should be noted that the scanner component 316 may also include one or more actuators (not illustrated) driving at least some optical components to rotate, tilt, pivot, or move in an angular manner about one or more axes, for example.

The scanner component 316 may be configured to scan the output beam 322 over a variety of horizontal angular ranges and/or vertical angular ranges. In other words, the scanner component 316 may be instrumental in providing the LiDAR system 310 with a desired Region of Interest (ROI) 380. The ROI 380 of the LiDAR system 310 may refer to an area, a volume, a region, an angular range, and/or portion(s) of the surroundings 250 about which the LiDAR system 310 may be configured to scan and/or can capture data.

It should be noted that the scanner component 316 may be configured to scan the output beam 322 horizontally and/or vertically, and as such, the ROI 380 of the LiDAR system 310 may have a horizontal direction and a vertical direction. For example, the LiDAR system 310 may have a horizontal ROI 380 of 360 degrees and a vertical ROI 380 of 45 degrees.

The scanner component 316 may be communicatively coupled to the controller component 320. As such, the controller component 320 may be configured to control the scanner component 316 so as to guide the output beam 322 in a desired direction downrange and/or along a desired scan pattern. Broadly speaking, a scan pattern may refer to a pattern or path along which the output beam 322 is directed by the scanner component 316 during operation.

The LiDAR system 310 may thus make use of the scan pattern to generate a point cloud substantially covering the ROI 380 of the LiDAR system 310. As will be described in greater detail herein further below, this point cloud of the LiDAR system 310 may be used to render a multi-dimensional map of objects in the surroundings 250 of the vehicle 220.

In operation, in certain embodiments, the light source component 312 emits pulses of light (represented by the output beam 322) which the scanner component 316 scans across the ROI 380 of the LiDAR system 310 in accordance with the scan pattern. As mentioned above, the object 330 may reflect one or more of the emitted pulses. The receiver component 318 receives or detects photons from the input beam 324 and generates one or more representative data signals. For example, the receiver component 318 may generate an output electrical signal (not depicted) that is representative of the input beam 324. The receiver component 318 may also provide the so-generated electrical signal to the controller component 320 for further processing.

The Receiver Component

The receiver component 318 is communicatively coupled to the controller component 320 and may be implemented in a variety of ways. For example, the receiver component 318 may comprise a photoreceiver, optical receiver, optical sensor, detector, photodetector, optical detector, optical fibers, and the like. As mentioned above, in some embodiments, the receiver component 318 acquires or detects at least a portion of the input beam 324 and produces an electrical signal that corresponds to the input beam 324. For example, if the input beam 324 includes an optical pulse, the receiver component 318 may produce an electrical current or voltage pulse that corresponds to the optical pulse detected by the receiver component 318.

It is contemplated that the receiver component 318 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiver component 318 may also comprise circuitry that performs signal amplification, sampling, filtering, signal conditioning, analog-to-digital conversion, time-to-digital conversion, pulse detection, threshold detection, rising-edge detection, falling-edge detection, and the like. For example, the receiver component 318 may include electronic components configured to convert a received photocurrent (e.g., a current produced by an APD in response to a received optical signal) into a voltage signal. The receiver component 318 may also include additional circuitry for producing an analog or digital output signal that corresponds to one or more characteristics (e.g., rising edge, falling edge, amplitude, duration, and the like) of a received optical pulse.

Controller Component

Depending on the implementation, the controller component 320 may include one or more processors, an application-specific integrated circuit (ASIC), a field-programmable gate array (FPGA), and/or other suitable circuitry. The controller component 320 may also include non-transitory computer-readable memory to store instructions executable by the controller component 320 as well as data which the controller component 320 may produce based on the signals acquired from other internal components of the LiDAR system 310 and/or may provide signals to the other internal components of the LiDAR system 310. The memory can include volatile (e.g., RAM) and/or non-volatile (e.g., flash memory, a hard disk) components. The controller component 320 may be configured to generate data during operation and store it in the memory. For example, this data generated by the controller component 320 may be indicative of the data points in the point cloud of the LiDAR system 310.

It is contemplated that in at least some non-limiting embodiments of the present technology, the controller component 320 may be implemented in a similar manner to the electronic device 210 and/or the computer system 100, without departing from the scope of the present technology.

In addition to collecting data from the receiver component 318, the controller component 320 may also be configured to provide control signals to, and potentially receive diagnostics data from, the light source component 312 and the scanner component 316.

As previously stated, the controller component 320 is communicatively coupled to one or more of the light source component 312, the scanner component 316, and the receiver component 318. The controller component 320 may receive electrical trigger pulses from the light source component 312, where each electrical trigger pulse corresponds to the emission of an optical pulse by the light source component 312. The controller component 320 may further provide instructions, a control signal, and/or a trigger signal to the light source component 312 indicating when the light source component 312 is to produce optical pulses.

Just as an example, the controller component 320 may be configured to send an electrical trigger signal that includes electrical pulses, so that the light source component 312 emits an optical pulse in response to each electrical pulse of the electrical trigger signal. It is also contemplated that, the controller component 320 may cause the light source component 312 to adjust one or more characteristics of light produced by the light source component 312 such as, but not limited to: frequency, period, duration, pulse energy, peak power, average power, and wavelength of the optical pulses.

It should be noted that the controller component 320 may be configured to determine a "time-of-flight" value for an optical pulse based on timing information associated with (i) when a given pulse was emitted by light source component 312 and (ii) when a portion of the pulse (e.g., from the input beam 324) was detected or received by the receiver component 318.

It is contemplated that the controller component 320 may be configured to analyze one or more characteristics of the electrical signals from the light source component 312 and/or the receiver component 318 to determine one or more characteristics of the object 330 such as the distance 390 downrange from the LiDAR system 310.

For example, the controller component 320 may determine the time of flight value and/or a phase modulation value for the emitted pulse of the output beam 322. Let it be assumed that the LiDAR system 310 determines a time-of-light value "T" representing, in a sense, a "round-trip" time for an emitted pulse to travel from the LiDAR system 310 to the object 330 and back to the LiDAR system 310. As a result, the controller component 320 may be configured to determine the distance 390 in accordance with the following equation:

$$D = \frac{c * T}{2} \quad \text{(Equation 1)}$$

wherein D is the distance 390, T is the time-of-flight value, and c is the speed of light (approximately $3.0 \times 10^8$ m/s).

As previously alluded to, the LiDAR system 310 may be used to determine the distance to one or more other potential objects located in the surroundings 250. By scanning the output beam 322 across the ROI 380 of the LiDAR system 310 in accordance with a scanning pattern, the LiDAR system 310 is configured to map distances (similar to the distance 390) to respective data points within the ROI 380 of the LiDAR system 310. As a result, the LiDAR system 310 may be configured to render these data points captured in succession (e.g., the point cloud) in a form of a multi-dimensional map.

As an example, this multi-dimensional map may be used by the electronic device 210 for detecting, or otherwise identifying, objects or determining a shape or distance of potential objects within the ROI 380 of the LiDAR system 310. It is contemplated that the LiDAR system 310 may be configured to repeatedly/iteratively capture and/or generate point clouds at any suitable rate for a given application.

It should be noted that a location of a given object in the surroundings 250 of the vehicle 220 may be overlapped, encompassed, or enclosed at least partially within the ROI of the LiDAR system 310. For example, the object 330 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Specific System Components

Figure 4:
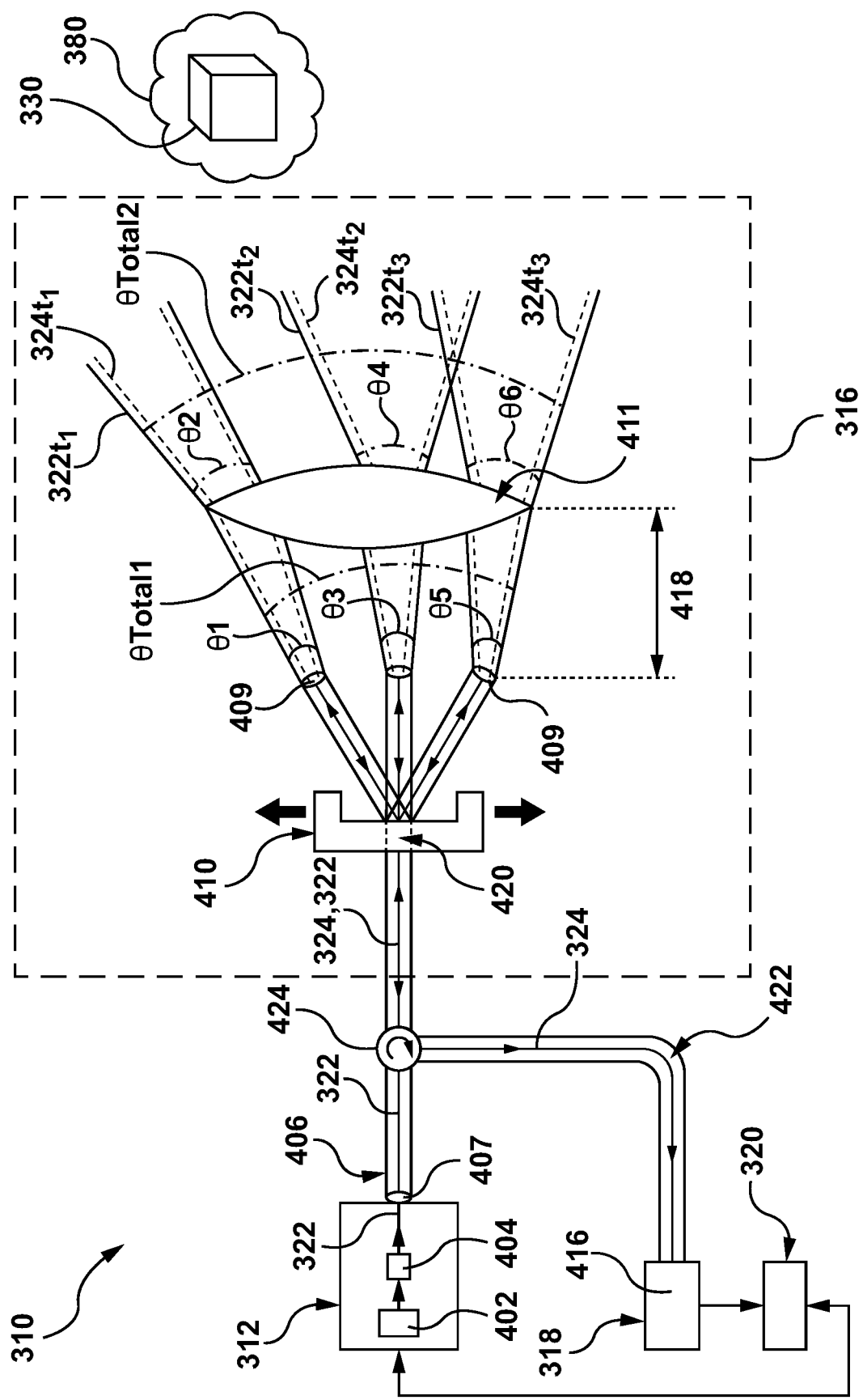
FIG. 4 depicts an implementation of the LiDAR system of FIG. 3 implemented in accordance to a specific non-limiting embodiment of the present technology.

With reference to FIG. 4, there is depicted an implementation of the LiDAR system 310 executed in accordance to a specific non-limiting embodiment of the present technology.

More specifically, in the LiDAR system 310 the light source component 312 comprises a laser 402 and a collimator 404; the scanner component 316 comprises an optical fiber 406 (also referred to herein as "first optical fiber") communicatively coupled with the light source component 312 and arranged to transmit the output beam 322 from an input end 407 to an output end 409 of the optical fiber 406 along an optical axis of the optical fiber 406, an actuator 410 for inducing movement in the output end 409 of the optical fiber 406, and a lens component 411 (also referred to herein as "optical lens") configured to transmit the output beam 322 through the lens component 411 as a modulated output beam towards the ROI 380; and the receiver component 318 comprises an optical detector 416. It is to be noted that other elements may be present but not illustrated for purposes of clarity. In use, actuation of the output end 409 of the optical fiber 406 causes a modulation of a spread of the output beam 322 emitted to the ROI 380, which will be described in further detail below.

The laser 402 is configured to generate the output beam 322. In certain embodiments, the generated output beam 322 comprises a plurality of sequential output beams. Further, each output beam 322 may be collimated and/or modulated by the collimator 404. As previously discussed, the LiDAR system 310 may make use of a given internal beam path from a plurality of internal beam paths 314 for emitting the output beam 322 towards the ROI 380. In one example, the given internal beam path amongst the plurality of internal beam paths 314 may allow providing the collimated and/or modulated output beam 322 from the collimator 404 towards the optical fiber 406.

The optical fiber 406 is configured to transmit the output beam 322 from its input end 407 to its output end 409 along an optical axis of the optical fiber 406. The output end 409 of the optical fiber 406 is spaced from the lens component 411 by a focal distance 418. The lens component 411 is arranged to diffract the output beam 322 such that an angular spread of the output beam 322 is increased. More specifically, the output beam 322 can be considered to be emitted from the output end 409 of the optical fiber 406, at time t1, with a first angular spread, $\theta_1$. After diffraction by the lens component 411, the output beam 322 has a second angular spread, $\theta_2$, which is greater than the first angular spread $\theta_1$. The LiDAR system 310 may be provided with one or more lens components 411 having different optical properties to one another and thus providing different second angular spread $\theta_2$. A mechanism may be provided for switching between the different lens components and adjusting the focal distance 418.

The actuator 410 comprises any component which can impart a movement (also referred to herein as "first optical fiber movement" and "optical fiber movement") to at least the output end 409 of the optical fiber 406 to modulate the relative positions of the output end 409 and the lens component 411. In this respect, the actuator 410 further comprises a fixing component (not shown) to fix the optical fiber 406 at a first fixing point 420 along a length of the optical fiber 406. The first fixing point 420 defines a pivot point along the length of the optical fiber 406 fixing the optical fiber 406 at the pivot point and permitting movement of the optical fiber 406 at the output end 409. In certain embodiments, the actuator 410 comprises a piezoelectric component which can induce movement through a change in shape induced by electrical current. The controller component 320 is communicatively connected to the actuator 410 and configured to send instructions to the actuator 410 in order to control its movement and hence the movement of the output end 409 of the optical fiber 406.

The lens component 411 comprises any transmissive optical device, such as a lens or a prism, which can increase an angle of spread of the output beam 322 (such as by refraction to disperse the light). The lens component 411 can be a simple or compound lens. In certain embodiments, the lens is a diverging lens. In certain embodiments, the lens component 411 permits transmission of light in a plurality of directions. For example, the lens component 411 permits both the output beam 322 and the input beam 324 to be transmitted therethrough.

The optical fiber movement comprises a plurality of positions of the output end 409 of the optical fiber 406. Three such positions, at times t1, t2 and t3, for example, are illustrated in FIG. 4, but it will be appreciated that the present technology is not limited to the illustrated three positions and can include more or fewer than three positions. At time t1, the output beam 322 is emitted from the output end 409 of the optical fiber 406 with a first angular spread, $\theta_1$, and after diffraction by the lens component 411, the output beam 322 has a second angular spread, $\theta_2$, which is greater than the first angular spread $\theta_1$. At time t2, the optical fiber 406 defines a first angular spread, $\theta_3$, on emission from the output end 409 of the optical fiber 406, and a second angular spread, $\theta_4$, after diffraction by the lens component 411, the second angular spread $\theta_4$ being greater than the first angular spread $\theta_3$. At time t3, the optical fiber 406 defines a first angular spread, $\theta_5$, on emission from the output end 409 of the optical fiber 406, and a second angular spread, $\theta_6$, after diffraction by the lens component 411, the second angular spread $\theta_6$ being greater than the first angular spread $\theta_5$.

During the optical fiber 406 movement, a total spread of the output beam 322 emitted by the output end 409 of the optical fiber 406 is defined as a total first spread $\theta_{Total1}$. After diffraction by the lens component 411, a total spread of the modulated output beam is defined as a total second spread $\theta_{Total2}$. By means of certain embodiments of the present technology, the total second spread $\theta_{Total2}$ is greater than the total first spread $\theta_{Total1}$. In this manner, the output beam 322 scanning the region of interest is enhanced.

The actuator 410 is arranged to move in any manner which can induce the movement of the output end 409 of the optical fiber 406. In certain embodiments, the actuator 410 is arranged to induce a swinging motion, in at least a single plane, in the output end 409 of the optical fiber 406. In this respect, and as illustrated in FIG. 4, in certain embodiments the actuator 410 is arranged to move backwards and forwards in opposing directions, as indicated by the arrows, in a single plane. The single plane may be a vertical plane or a horizontal plane. In other embodiments (not illustrated), the actuator 410 is arranged to move in two planes which can induce a swinging motion in a vertical and a horizontal plane of the output end 409 of the optical fiber 406. In such alternative embodiments, the actuator 410 can be implemented as a multi-component device, such as multiple piezoelectric components.

In certain embodiments, a plane of the total first spread $\theta_{Total1}$ is the same as a plane of the optical fiber movement. In certain embodiments, a plane of the total second spread $\theta_{Total2}$ is the same as the plane of the optical fiber movement. The total first spread $\theta_{Total1}$ is between about 5 to about 40°, and the total second spread $\theta_{Total2}$ is between about 5 to about 40° or more than about 5 to about 40°, in certain embodiments.

In embodiments in which the optical fiber movement is on two planes, the total first spread $\theta_{Total1}$ may also be on two planes. The two planes of the optical fiber movement may be the same as the two planes of the first spread $\theta_{Total1}$.

Thus, due to the movement of the output end 409 of the optical fiber 406, an increased total angle of spread of the output beam 322 transmitted to the ROI 380 can be obtained, which may then be utilized to derive multiple angular resolutions of the object 330 in the ROI 380. As a result, in certain embodiments, a single LiDAR system 310 may scan and capture multiple angular resolutions of the object 330. The number of LiDAR systems (or number of light sources and light detectors) required to scan an object can be minimized, thereby minimizing costs for operating the SDC and increasing a longevity of the LiDAR system due to fewer moving parts.

It is also contemplated that in certain embodiments, the LiDAR system 310 may be configured to rotate horizontally to scan the ROI 380. In other embodiments, the light source component 312 may be configured to rotate horizontally to scan the ROI 380. In this respect, one or both of the LiDAR system 310 and the light source component 312 may be positioned on a platform (not shown) configured to move horizontally. As an example, such a platform may be located inside the LiDAR system 310 or may be a part of the common housing 340. In other embodiments, it is the scanner component 316 that is arranged to rotate horizontally. In certain embodiments, the horizontal rotation occurs simultaneously with the vertical and/or horizontal spreading of the output beam 322 created by the actuator 410 movement.

As previously discussed, the LiDAR system 310 may make use of a given internal beam path from a plurality of internal beam paths 314 for emitting the output beam 322 (generated by the light source component 312) towards the surroundings 250 and for receiving the reflected beams by the receiver component 318. In FIG. 4, the output beam 322 incident on the ROI 380 at t1, t2 and t2 is represented as $322_{t1}$, $322_{t2}$, and $322_{t3}$. It is contemplated that at least a portion of the output beam $322_{t1}$, $322_{t2}$, and $322_{t3}$ may be reflected by the object 330 in the ROI 380. Such reflected portion of the output beam is the input beam 324 and represented at times t1, t2 and t3 respectively by input beam $324_{t1}$, $324_{t2}$, and $324_{t3}$ which may return back towards the LiDAR system 310 and be captured by the LiDAR system 310 via the receiver component 318.

In certain embodiments, the LiDAR system 310 may make use of another given internal beam path from the plurality of internal beam paths 314 for providing the input beam $324_{t1}$, $324_{t2}$, and $324_{t3}$ to the receiver component 318. In one example, the another given internal beam path amongst the plurality of internal beam paths 314 may allow providing the input beams $324_{t1}$, $324_{t2}$, and $324_{t3}$ from the scanner component 316 to the receiver component 318. In another example, the another given internal beam path amongst the plurality of internal beam paths 314 may allow providing the input beams $324_{t1}$, $324_{t2}$, and $324_{t3}$ directly from the ROI 380 to the receiver component 318 (without the input beam $324_{t1}$, $324_{t2}$, and $324_{t3}$ passing through the scanner component 316).

In at least some embodiments, a return pathway associated with the input beams $324_{t1}$, $324_{t2}$, and $324_{t3}$ reflected from the ROI 380 towards the receiver component 318 may include a sub-portion that is a same path as one used by the output beams $322_{t1}$, $322_{t2}$, and $322_{t3}$. As such, the return pathway may include the input beams $324_{t1}$, $324_{t2}$, and $324_{t3}$ being incident on, and being reflected by, the lens component 411. In other words, at least some of the output beams $322_{t1}$, $322_{t2}$, and $322_{t3}$, and at least some of the input beams $324_{t1}$, $324_{t2}$, and $324_{t3}$ may at least partially overlap or share a common propagation axis, so that they travel along substantially the same optical path (albeit in different directions).

In other embodiments, it is contemplated that the output beams $322_{t1}$, $322_{t2}$, and $322_{t3}$ and the input beams $324_{t1}$, $324_{t2}$, and $324_{t3}$ may include a sub-portion that is a different path to one another. In other words, in certain embodiments, the input beams $324_{t1}$, $324_{t2}$, and $324_{t3}$ and the output beams $322_{t1}$, $322_{t2}$, and $322_{t3}$ do not overlap or share a common propagation axis inside the LiDAR system 310.

Turning now to FIGS. 5-13, in which different embodiments of the internal beam paths 314 between the light source component 312, the receiver component 318 and the scanner component 316 are illustrated, and more specifically different embodiments of the return path of the input beam 324. The scanner component 316 comprises the actuator 410 and the lens component 411 as described above. In the illustrated examples, the input beam 324, which comprises a reflected portion of the output beam 322, passes through the lens component 411 and is directed to the receiver component 318 through a portion of the optical fiber 406, and (ii) a return optical fiber 422.

FIGS. 5 and 6 illustrate further the transmission of the output beam 322 and the input beam 324 of the LiDAR system 310 embodiment of FIG. 4. In these embodiments, the optical fiber 406 is used for both transmission of the input beam 324 and for transmission of the output beam 322. An optical circulator 424 connects the optical fiber 406 to the return optical fiber 422 which in turn is communicatively coupled to the receiver component 318 (FIG. 5). The optical fiber 406 in these embodiments comprises a single channel through which light may propagate. In certain embodiments, the optical fiber 406 has cladding 432 and core 434 structure through which light can travel in two opposing directions at any one time (FIG. 6). The optical circulator 424 is communicatively coupled to the controller component 320. The controller component 320 can cause the optical circulator 424 to control the direction of light propagation through the optical fiber 406. In other words, the controller component 320 can cause the optical circulator 424 to redirect the input beam 324 to the return optical fiber 422. In an output phase, the optical circulator 424 is configured to allow light to be transmitted in a direction from the light source component 312 to the scanner component 316. In an input phase, the optical circulator 424 is configured to transmit light in a direction from the scanner component 316 to the receiver component 318 (from the scanner component 316 to the optical circulator 424, and from the optical circulator 424 to the receiver component 318 via the return optical fiber 422). The controller component 320 can cause the modulation of the scanner component 316 between the input phase and the output phase based on one or more triggers. Such triggers include a timing of the emission of the output beam 322 by the light source, a position of the output end 409 of the optical fiber 406, a position of the actuator 410, a predetermined time, and a predetermined time interval, to name a few.

The embodiment of the LiDAR system 310 of FIG. 7 differs from that of FIG. 5 in that instead of the optical fiber 406 having a single propagation channel, a double channel optical fiber 436 is used for transmission of the input beam 324 and the output beam 322. The double channel optical fiber 436 comprises two channels, one channel for propagation of the output beam 322, and the other channel for propagation of the input beam 324. As for the optical fiber 406, the double channel optical fiber 436 is fixed at the first fixing point 420 and has an output end (not shown) which is arranged to be moved by the actuator 410. The optical circulator 424 communicatively couples the return optical fiber 422 to the double channel optical fiber 436 (FIG. 7). The cross-sectional structure of the double channel optical fiber 436 in certain embodiments is illustrated in FIG. 8 and comprises a core 438, an inner cladding 440, and an outer cladding 441. In certain embodiments, the core 438 is arranged to transmit the output beam 322, and the inner cladding 440 is arranged to transmit the input beam 324. The optical circulator 424 is arranged to redirect the input beam 324 coming from the scanner component 316 to the return optical fiber 422. In an output phase, the optical circulator 424 is configured to allow light to be transmitted in a direction from the light source component 312 to the scanner component 316. In the input phase, the optical circulator 424 is configured to transmit light from the scanner component 316 to the optical circulator 424, and from the scanner component 316 to the receiver component 318 via the return optical fiber 422. As before, the controller component 320 is configured to cause the modulation of the scanner component 316 between the input phase and the output phase based on one or more triggers. Such triggers may include a timing of the emission of the output beam 322 by the light source, a position of the output end 409 of the optical fiber 406, a position of the actuator 410, a predetermined time, and a predetermined time interval, to name a few.

In another embodiment, instead of the double channel optical fiber 436, an optical fiber with three internal pathways (not shown) is provided for transmission of the input beam 324 and the output beam 322. In such embodiments, a coupler may be used.

The embodiment of the LiDAR system 310 of FIG. 9 differs from that of FIG. 5 in that the optical fiber 406 is used for transmission of the output beam 322, and the return optical fiber 422 (also referred to herein as "second optical fiber") is used for transmission of the input beam 324 only (FIG. 9). There is no shared pathway between the input beam 324 and the output beam 322. In this respect, the return optical fiber 422 is communicatively coupled at an input end to the receiver component 318, and at an output end to the scanner component 316. In certain embodiments, the actuator 410 is coupled to the return optical fiber 422 for imparting a movement to the input end ("second optical fiber movement"). In certain other embodiments, the return optical fiber 422 is coupled to another actuator (not shown) for imparting the movement. The controller component 320 is configured to control the respective movements of the optical fiber 406 and the return optical fiber 422, and in this respect, in certain embodiments, the movements of the optical fiber 406 and the return optical fiber 422 are coordinated. The movements of the optical fiber 406 and the return optical fiber 422 are simultaneous in certain embodiments.

The optical fiber 406 and the return optical fiber 422 may have any suitable configuration. On certain embodiments, the optical fiber 406 and the return optical fiber 422 each have the core 434 and the cladding 432 configuration (FIG. 10) of FIG. 6.

The embodiment of the LiDAR system 310 of FIG. 11 differs from that of FIG. 9 in that instead of the single return optical fiber 422 communicatively coupled at one end to the receiver component 318, there may be provided a plurality of return optical fibers 422 and a plurality of receiver components 318. Each one of the plurality of return optical fibers 422 may be connected at one end to the scanner component 316, and at their other respective end to the given receiver component 318. The plurality of return optical fibers 422 may be configured as a fiber bundle or as a fiber array (FIGS. 12 and 13). In yet further embodiments, the optical fiber 406 may comprise a plurality of optical fibers (not shown). The number of optical fibers and return optical fibers are not limited and may comprise any number suitable to the given application.

Any of the optical fiber 406, return optical fiber 422, and the double channel optical fiber 436 may also include an outer jacket layer which is not illustrated in the figures.

Figure 14:
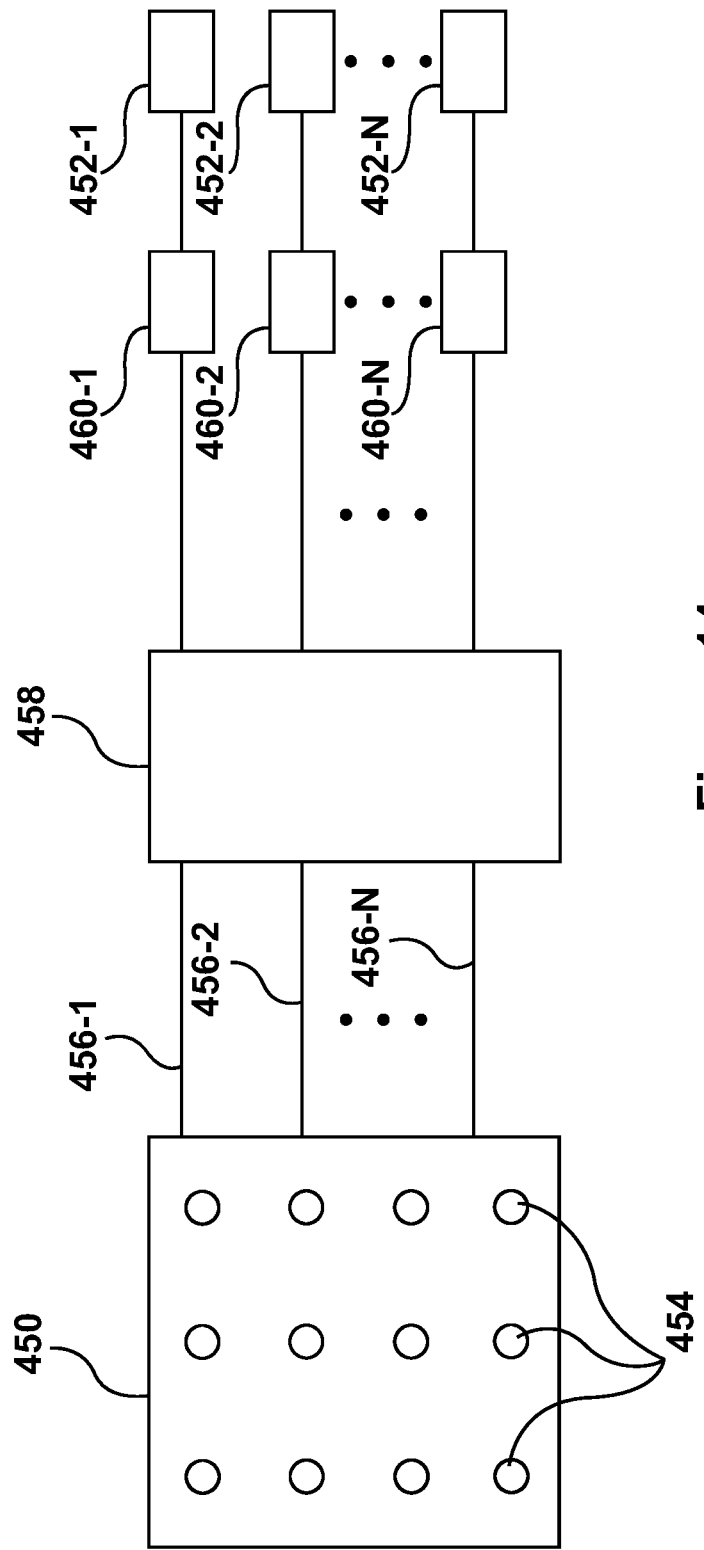
FIG. 14 depicts a schematic illustration of a detector system of the LiDAR system of FIG. 4 implemented in accordance to certain non-limiting embodiments of the present technology.

Turning now to the optical detector 416 of the receiver component 318. FIG. 14 depicts a representative implementation of an optical detector 416 executed in accordance to a specific non-limiting embodiment of the present technology. As depicted, in certain embodiments, the optical detector 416 employs a fiber optic array 450 and a plurality of detectors 452-1, 452-2, . . . 452-N. The fiber optic array 450 comprises a plurality of optical fibers 454. The plurality of optical fibers 454 associated with the fiber optic array 450 may be connected to the plurality of detectors 452-1, 452-2, . . . 452-N to form N optical paths 456-1, 456-2, . . . 456-N from the fiber optic array 450 to the plurality of detectors 452-1, 452-2, . . . 452-N.

In certain embodiments, the plurality of detectors 452-1, 452-2, . . . 452-N correspond, one-to-one, to the plurality of optical fibers 454 associated with the fiber optic array 450, and each detector in the plurality of detectors 452-1, 452-2, . . . 452-N may be configured to receive the input beam 324 through the fiber optic array 450. In other words, a given optical fiber 454 of the fiber optic array 450 is associated with a given detector of the plurality of detectors 452-1, 452-2, . . . 452-N, in a one-to-one relationship. In these embodiments, a given optical fiber and a given detector are connected by a given optical path.

In the above one-to-one arrangement of the plurality of detectors 452-1, 452-2, . . . 452-N and the plurality of optical fibers 454, an increased density of data points in the given ROI 380 may be achieved, and hence an increased resolution of the object 330 in the ROI 380, as will be described below. By increased density of data points in the given ROI 380 is meant an increased number of output beams 322 incident in the ROI 380 in a given time, and subsequently an increased number of data points defined in the ROI 380 in the given time.

In embodiments with the one-to-one arrangement, the controller component 320 may be configured to monitor which of the optical fibers 454 of the fiber optic array 450 and its associated detector is receiving which input beam 324. With this monitoring process, the light source component 312 may be configured to emit the output beam 322 without waiting for the detection of the prior input beam 324, resulting, in certain embodiments, in the increased density of the data points.

It is contemplated that in certain other embodiments, instead of a one-to-one relationship between optical fibers of the fiber optic array 450 and the plurality of detectors 452-1, 452-2, . . . 452-N, a subset of the plurality of optical fibers 454 associated with the fiber optic array 450 may have a common detector from the plurality of detectors 452-1, 452-2, . . . 452-N. In these embodiments, there would be a plurality of optical paths associated with a single detector. In such embodiments, reducing the number of detectors may also result in a costs saving. Also, in certain embodiments the common detector from the plurality of detectors 452-1, 452-2, . . . 452-N may require less power and space thereby, saving some physical space power requirement while implementing the LiDAR system 310.

In certain embodiments, the optical detector 416 may also include an optical fiber connector 458 and a plurality of micro-lens 460-1, 460-2, . . . 460-N. The optical fiber connector 458 may be configured to connect the plurality of optical fibers 454 associated with the fiber optic array 450 to the plurality of detectors 452-1, 452-2, . . . 452-N to form the N optical paths 456-1, 456-2, . . . 456-N from the fiber optic array 450 to the plurality of detectors 452-1, 452-2, . . . 452-N. The plurality of micro-lens 460-1, 460-2, . . . 460-N may correspond, one-to-one, to the plurality of detectors 442-1, 442-2, . . . 442-N, and may be configured to converge the input beams 324 transmitted via the plurality of optical fibers 454 associated with the fiber optic array 450 to the corresponding plurality of detectors 452-1, 452-2, . . . 452-N.

Turning now to the optical fibers 454, it is contemplated that in certain embodiments, the plurality of optical fibers 454 may be constructed as the fiber optic array 450 in any manner, such as by laser welding, butt welding, soldering, or the like. Further, at least some of the optical fibers in the fiber optic array 450 may have a polarization-maintaining axis which is oriented or aligned based on positioning of the plurality of optical fibers. As an example, the polarization-maintaining axis of the optical fibers 454 are all aligned to be substantially parallel to a single plane. As such, the polarization-maintaining axis may assist the optical fibers 454 to control and maintain certain polarizations for example linear polarization.

The optical fibers 454 may have any suitable configuration. In certain embodiments, at least some of the optical fibers 454 may have a circular cross-section. In certain other embodiments, at least some of the optical fibers 454 may have a cross-section which is not circular, such as a polygonal (e.g., octagon, hexagon or other suitable polygon) shape, or a curved circumference having at least one flat (e.g., a flatted side on a circular cross section), or any other shape. The optical fibers 454 may have any suitable refractive index.

In certain embodiments, at least some of the optical fibers 454 may further include a filter, such as a fiber Bragg grating (FBG) filters (not depicted) to filter certain wavelengths of light. In certain embodiments, FBG filters reflect certain wavelengths of light and transmit other wavelengths.

It is contemplated that the individual optical fibers 454 in the fiber optic array 450 may be arranged in any manner such as in aligned rows, staggered rows, circular or spiral configuration, or the like. It will be appreciated that the physical characteristics of the fiber optic array 450 as well as the individual optical fibers 454 are not limited. Similarly, receiving ends of the plurality of optical fibers 454 associated with the fiber optic array 450 through which the input beam 324 is received can be arranged in any manner as a two dimensional array, such as with equal or unequal spacing. The fiber optic array 450 may have an equal or unequal number of receiving ends along an x-axis or a y-axis.

In certain embodiments, there is provided a receiving lens (not shown) configured to focus the input beams 324 to one of the receiving ends of the optical fibers 454 of the fiber optic array 450. In certain embodiments, a distance between the receiving lens and one of the receiving ends of the optical fibers 454 of the fiber optic array 450 comprises a focal distance of the input beam 324. The end face of the fiber optic array 450 may be on a focal plane of the receiving lens. Further, for a given detection time interval, the receiving lens may be configured to focus different input beams 324 to different receiving ends of the optical fibers 454 of the fiber optic array 450. In this respect, in certain embodiments the receiving lens may be configured to move or tilt in a suitable manner such that at least one the input beams 324 may be focused on at least one of plurality of optical fibers 454. The movement of the receiving lens may be controlled by the controller component 320.

As previously discussed, in certain embodiments, the plurality of detectors 452-1, 452-2, . . . 452-N may be configured to detect at least an optical signal of the input beams 324 and produce a corresponding electrical signal. For example, if the input beam 324 comprises an optical pulse, the plurality of detectors 452-1, 452-2, . . . 452-N may detect the optical pulses and produce electrical signals such as electrical current or voltage pulses that correspond to the detected optical signals.

It is contemplated that the plurality of detectors 452-1, 452-2, . . . 452-N may be implemented as photodetectors with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

Turning now to the controller component 320, in certain embodiments, the plurality of detectors 452-1, 452-2, . . . 452-N are communicatively coupled to the controller component 320. The controller component 320 is configured to receive the electrical signals from the plurality of detectors 452-1, 452-2, . . . 452-N and may be further be configured to analyse the electrical signals to detect the object 330 in the ROI 380. It is contemplated that the controller component 320 may use any suitable techniques (such as, techniques based on determining "Time-of-Flight" as previously discussed) for detecting objects without departing from the principles presented herein.

The controller component 320 may further be communicatively coupled to the light source component 312 in such a manner that the controller component 320 may be configured to control the emissions from the light source component 312. In one embodiment, the emission of the next output beam(s) after the emission of the output beam 322 may be coordinated with detection of the input beams 324 by the optical detector 416. As such, the controller component 320 may be configured to cause the light source component 312 to emit the output beam(s) after the input beam 324 has been detected. In other embodiments, the light source component 312 may be configured to operate independently of the optical detector 416. That is, the light source component 312 may emit the next output beam(s) without coordinating with the detection of the input beams 324 by the optical detector 416.

Computer-Implemented Methods

Figure 15:
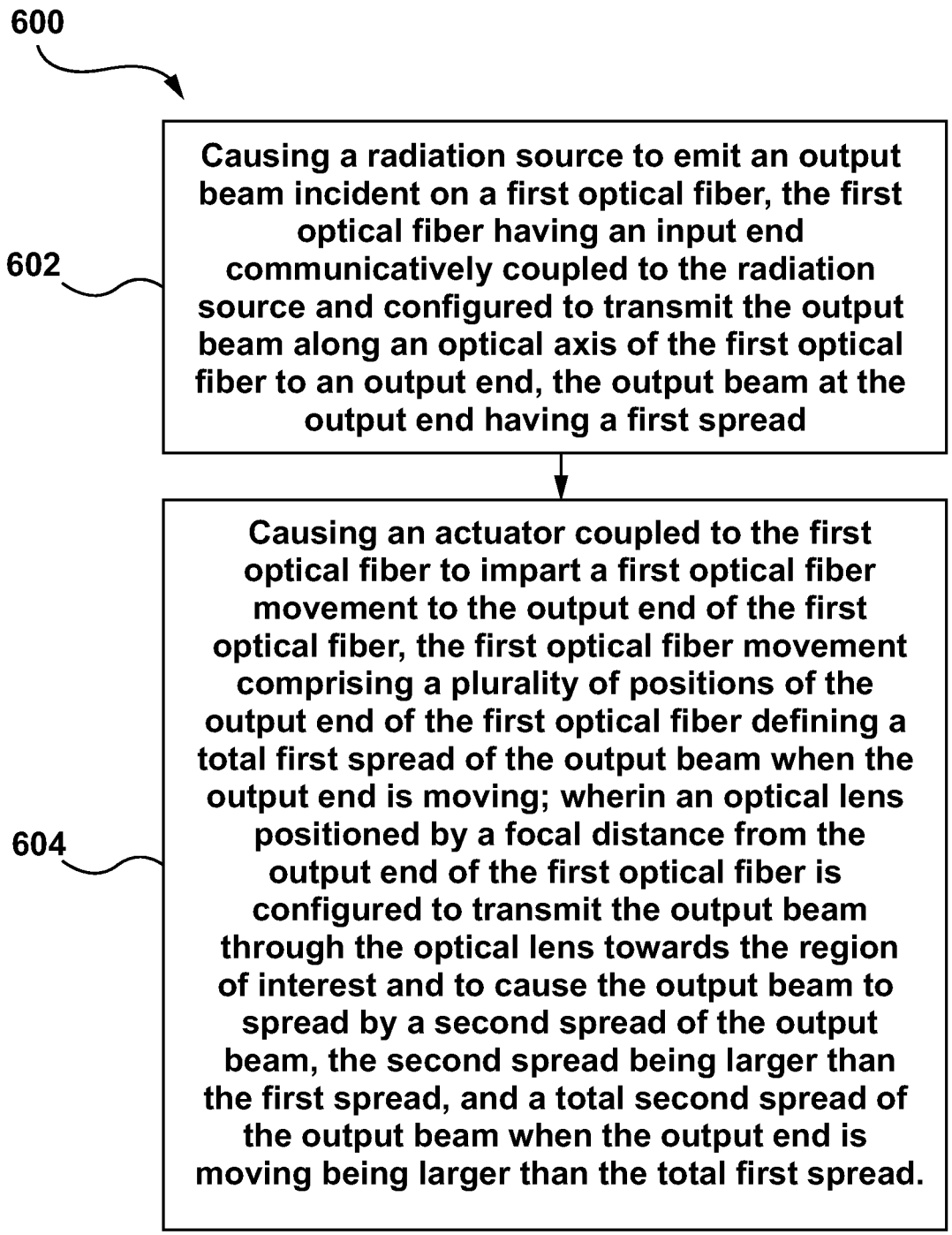
FIG. 15 illustrates a flowchart of a method for detecting objects in a region of interest, in accordance with various non-limiting embodiments of the present technology.

Now turning to FIG. 15, a flowchart of a method 600 for detecting objects in a region of interest is illustrated, in accordance with various non-limiting embodiments of the present technology.

In some non-limiting embodiments of the present technology, the method 600 may be implemented by the controller component 320 communicatively connected to the LiDAR system 310. As previously discussed, in at least some non-limiting embodiments of the present technology, the controller component 320 may include one or more processors and may be implemented in a similar manner to the electronic device 210 and/or the computer system 100, without departing from the scope of the present technology. The method 600 begins at step 602.

Step 602: causing a radiation source to emit an output beam incident on a first optical fiber, the first optical fiber having an input end communicatively coupled to the radiation source and configured to transmit the output beam along an optical axis of the first optical fiber to an output end, the output beam at the output end having a first spread At step 602, the controller component 320 provides instructions, a control signal, and/or a trigger signal to the light source component 312 indicating when the radiation source component 312 (such as the light source component) is to emit the output beam 322 towards the optical fiber 406. In one or more steps associated with the method 600, the controller component 320 may be configured to cause the light source component 312 to emit the output beam 322 in certain conditions. Such conditions may include one or more of: upon operation of the vehicle 220 in self-driving mode; when the vehicle 220 is in motion irrespective of the driving mode; when the vehicle 220 is stationary; when the vehicle 220 is initially turned on; at a predetermined time or location; and based on a manual operation performed by a user operating the vehicle 220 etc.

Step 604: causing an actuator coupled to the first optical fiber to impart a first optical fiber movement to the output end of the first optical fiber, the first optical fiber movement comprising a plurality of positions of the output end of the first optical fiber defining a total first spread of the output beam when the output end is moving; wherein an optical lens positioned by a focal distance from the output end of the first optical fiber is configured to transmit the output beam through the optical lens towards the region of interest and to cause the output beam to spread by a second spread of the output beam, the second spread being larger than the first spread, and a total second spread of the output beam when the output end is moving being larger than the total first spread.

In Step 604 of the method 600, the processor causes the actuator 410 coupled to the optical fiber 406 to impart a movement to the output end 409 of the optical fiber 406. The movement comprises a plurality of positions of the output end 409 of the optical fiber 406 which define a total first spread $\theta_{Total1}$ of the output beam 322 when the output end 409 is moving and in the plurality of positions. The output beam 322 is transmitted through the lens component 411, which is positioned at a distance corresponding to the focal distance 418 from the output end 409 of the optical fiber 406. The lens component 411 is configured to transmit the output beam 322 towards the ROI 380 and to cause the output beam 322 to spread by the second spread $\theta_1$', the second spread $\theta_2$, being larger than the first spread $\theta_1$. The total second spread $\theta_{Total2}$ of the output beam 322 when the output end 409 is moving is thus larger than the total first spread $\theta_{Total1}$.

In one or more non-limiting steps associated with the method 600, the controller component 320 receives a detected optical signal from the input beam 324, such as from the receiver component 318 or the optical detector 416. In embodiments where the optical detector 416 is a fiber optic array 450, the method 600 comprises determining an association between a given detector of the plurality of detectors 452, the detected optical signal and a given output beam 322. In certain embodiments in which the LiDAR system includes the optical circulator 424, the method comprises causing the input beam 324 to be re-directed towards the receiver component 318.

In one or more non-limiting steps associated with the method 600, in order to determine the object 330 in the ROI 380, the controller component 320 may be configured to determine a "time-of-flight" value for a light beam based on timing information associated with (i) when a given light beam (e.g. the output beam 322) was emitted by light source component 312, and (ii) when a portion of the light beam was detected or received by the receiver component 318.

In one or more non-limiting steps associated with the method 600, the method 600 further comprises the processor selectively controlling the actuator 410 to modulate the optical fiber movement to control the angle of spread of the output beam 322 in the ROI 380.

In one or more non-limiting steps associated with the method 600, the processor may control the emission of a next output beam 322 after the emission of an earlier output beam 322 and such emission may be coordinated with detection of the input beam by the optical detector 416. As such, the controller component 320 may be configured to cause the light source component 312 to emit the output beam 322 after the input beam 324 has been detected.

In one or more non-limiting steps associated with the method 600, the light source component 312 may be configured to operate independently of the optical detector 416. That is, the light source component 312 may emit the output beam 322 without coordinating with the detection of the input beam 324 detected by the optical detector 416.

It should be apparent to those skilled in the art that at least some embodiments of the present technology aim to expand a range of technical solutions for addressing a particular technical problem, namely improving performance of a LiDAR system while reducing the hardware burden imposed on various LiDAR systems by incorporating MEM components and modulating the amplitude of oscillations associated with the MEM components for selectively controlling the intervals of the output beam(s).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A LiDAR system for detecting objects in a region of interest, the system comprising:
   a radiation source for emitting an output beam;
   a first optical fiber with an input end communicatively coupled to the radiation source for receiving the output beam and configured to transmit the output beam having an optical axis along the first optical fiber to an output end for emitting the output beam, the output beam having a first spread;
   an actuator coupled to the first optical fiber for imparting a first optical fiber movement to the output end of the first optical fiber, the first optical fiber movement comprising a plurality of positions of the output end of the first optical fiber defining a total first spread of the output beam when the output end is moving;
   an optical lens positioned by a focal distance from the output end of the first optical fiber, the optical lens being configured to transmit the output beam through the optical lens towards the region of interest and being a diverging lens to cause the output beam to spread by a second spread of the output beam, the second spread being larger than the first spread, and a total second spread of the output beam when the output end is moving being larger than the total first spread; and
   a processor for controlling the actuator and the first optical fiber movement to modulate an angle of spread of radiation of the output beam in the region of interest.

2. The LiDAR system of claim 1, wherein the actuator comprises a piezoelectric component.

3. The LiDAR system of claim 2, wherein the total second spread of the output beam is between about 5 and about 40°.

4. The LiDAR system of claim 1, further comprising a detection system for detecting an input beam from the region of interest, the detection system comprising:
   a detector; and
   a second optical fiber configured to transmit the input beam to a detector, the second optical fiber having:
      an input end for receiving the input beam, and
      an output end communicatively coupled to the detector, wherein the actuator is coupled to the second optical fiber for imparting a second optical fiber movement to the input end of the second optical fiber, the processor configured to control the actuator and the second optical fiber movement of the second optical fiber.

5. The LiDAR system of claim 4, wherein the actuator is configured to cause the second optical fiber movement to be physically coordinated with the first optical fiber movement.

6. The LiDAR system of claim 4, wherein the actuator is configured to induce the first optical fiber movement simultaneously with the second optical fiber movement.

7. The LiDAR system of claim 4, the actuator comprising a fixing component to fix the second optical fiber at a second fixing point along a length of the second optical fiber, the second fixing point defining a pivot point of the input end of the second optical fiber.

8. The LiDAR system of claim 1, further comprising a detection system for detecting an input beam from the region of interest, the detection system comprising:
   a detector; and
   a second optical fiber configured to transmit the input beam to the detector and selectively communicatively coupled to the first optical fiber, at least the output end of the first optical fiber being arranged to transmit the input beam from the region of interest to the second optical fiber.

9. The LiDAR system of claim 8, further comprising an optical circulator for selectively transmitting the input beam from the region of interest to the second optical fiber.

10. The LiDAR system of claim 8, wherein the at least the output end of the first optical fiber has a double cladding construction comprising a first channel for transmitting the input beam and a second channel for transmitting the output beam.

11. The LiDAR system of claim 1, wherein the total first spread of the first optical fiber is along a first plane, the first plane being the same as a plane of the first optical fiber movement.

12. The LiDAR system of claim 11, wherein the total second spread is along the first plane.

13. The LiDAR system of claim 1, the actuator comprising a fixing component to fix the first optical fiber at a first fixing point along a length of the first optical fiber, the first fixing point defining a pivot point of the output end of the first optical fiber.

14. The LiDAR system of claim 1, wherein the total first spread of the output beam is between about 5 and about 40°.

15. The LiDAR system of claim 1, wherein the total first spread of the first optical fiber is along two planes, the two planes being the same as two planes of the first optical fiber movement.

16. A LiDAR method for detecting objects in a region of interest, the method being implemented by a processor communicatively connected to a LiDAR system, the method comprising:

causing a radiation source to emit an output beam incident on a first optical fiber, the first optical fiber having an input end communicatively coupled to the radiation source and configured to transmit the output beam along an optical axis of the first optical fiber to an output end, the output beam at the output end having a first spread;

causing an actuator coupled to the first optical fiber to impart a first optical fiber movement to the output end of the first optical fiber, the first optical fiber movement comprising a plurality of positions of the output end of the first optical fiber defining a total first spread of the output beam when the output end is moving; wherein an optical lens positioned by a focal distance from the output end of the first optical fiber is configured to transmit the output beam through the optical lens towards the region of interest and being a diverging lens to cause the output beam to spread by a second spread of the output beam, the second spread being larger than the first spread, and a total second spread of the output beam when the output end is moving being larger than the total first spread.

17. The method of claim 16, further comprising the processor selectively controlling the actuator to modulate the first optical fiber movement to control an angle of spread of radiation of the output beam in the region of interest.

18. The method of claim 17, wherein the modulation of the first optical fiber movement is responsive to a detected object in the region of interest.

* * * * *